United States Patent
Na et al.

(10) Patent No.: US 9,708,699 B2
(45) Date of Patent: Jul. 18, 2017

(54) BULK GLASS STEEL WITH HIGH GLASS FORMING ABILITY

(71) Applicant: Glassimetal Technology, Inc., Pasadena, CA (US)

(72) Inventors: Jong Hyun Na, Pasadena, CA (US); Michael Floyd, Pasadena, CA (US); Glenn Garrett, Pasadena, CA (US); Marios D. Demetriou, West Hollywood, CA (US); William L. Johnson, San Marino, CA (US)

(73) Assignee: Glassimetal Technology, Inc., Pasadena, CA (US)

( * ) Notice: Subject to any disclaimer, the term of this patent is extended or adjusted under 35 U.S.C. 154(b) by 325 days.

(21) Appl. No.: 14/335,163

(22) Filed: Jul. 18, 2014

(65) Prior Publication Data

US 2015/0020929 A1 Jan. 22, 2015

Related U.S. Application Data

(60) Provisional application No. 61/847,973, filed on Jul. 18, 2013.

(51) Int. Cl.
| | | |
|---|---|---|
| *C22C 45/02* | (2006.01) | |
| *C22C 38/00* | (2006.01) | |
| *C22C 38/44* | (2006.01) | |
| *C22C 33/00* | (2006.01) | |
| *C22C 38/54* | (2006.01) | |
| *C21C 7/076* | (2006.01) | |

(52) U.S. Cl.
CPC .............. *C22C 45/02* (2013.01); *C21C 7/076* (2013.01); *C22C 33/003* (2013.01); *C22C 38/002* (2013.01); *C22C 38/44* (2013.01); *C22C 38/54* (2013.01); *Y02P 10/242* (2015.11)

(58) Field of Classification Search
CPC ..... C21C 7/076; C22C 33/003; C22C 38/002; C22C 38/44; C22C 38/54; C22C 45/02
USPC ........................................................ 148/548
See application file for complete search history.

(56) References Cited

U.S. PATENT DOCUMENTS

| | | |
|---|---|---|
| 4,152,144 A | 5/1979 | Hasegawa et al. |
| 5,961,745 A | 10/1999 | Inoue et al. |
| 6,053,989 A | 4/2000 | Orillion et al. |
| 6,077,367 A | 6/2000 | Mizushima et al. |
| 6,689,234 B2 | 2/2004 | Branagan |
| 7,282,103 B2 | 10/2007 | Sakamoto et al. |
| 7,622,011 B2 | 11/2009 | Inoue et al. |
| 7,918,946 B2 | 4/2011 | Sato |
| 8,529,712 B2 | 9/2013 | Demetriou et al. |
| 8,911,572 B2 | 12/2014 | Kim et al. |
| 2004/0140016 A1 | 7/2004 | Sakamoto et al. |
| 2006/0254386 A1 | 11/2006 | Inoue et al. |
| 2007/0079907 A1 | 4/2007 | Johnson et al. |
| 2010/0096045 A1 | 4/2010 | Sato |
| 2010/0300148 A1 | 12/2010 | Demetriou et al. |
| 2014/0007991 A1 | 1/2014 | Demetriou et al. |

FOREIGN PATENT DOCUMENTS

| | | |
|---|---|---|
| CN | 1442866 | 9/2003 |
| CN | 101289718 | 10/2008 |
| EP | 0747498 | 12/1996 |
| JP | 08-333660 | 12/1996 |
| JP | 11-071657 | 3/1999 |
| JP | 11-293427 | 10/1999 |
| JP | 2001-338808 | 12/2001 |
| JP | 2005-264260 | 9/2005 |
| JP | 2005-290468 | 10/2005 |
| KR | 10-0582579 | 5/2006 |
| KR | 10-2009-0038016 | 4/2009 |
| WO | WO 99/02748 | 1/1999 |

OTHER PUBLICATIONS

Gu et al., "Ductility improvement of amorphous steels: roles of shear modulus and electronic structure," *Acta Materialia*, 2008, 56:88-94.

Makino et al., "Fe-Metalloid Metallic Glasses with High Magnetic Flux Density and High Glass-Forming Ability," *Materials Science Forum*, 2007, 561-565:1361-1366.

Murakami (Editor), *Stress Intensity Factors Handbook*, vol. 2, Oxford: Pergamon Press, 1987, 4 pages.

*Primary Examiner* — Jessee Roe
*Assistant Examiner* — Jenny Wu
(74) *Attorney, Agent, or Firm* — Polsinelli PC

(57) ABSTRACT

The present disclosure provides specified ranges in the Fe—Mo—Ni—Cr—P—C—B alloys such that the alloys are capable of forming bulk glasses having unexpectedly high glass-forming ability. The critical rod diameter of the disclosed alloys is at least 10 mm.

18 Claims, 20 Drawing Sheets

BULK GLASS STEEL WITH HIGH GLASS FORMING ABILITY

CROSS-REFERENCE TO RELATED APPLICATIONS

The present application claims the benefit of U.S. Provisional Patent Application No. 61/847,973, entitled "Bulk Glass Steel with High Glass Forming Ability", filed on Jul. 18, 2013, which is incorporated herein by reference in its entirety.

TECHNICAL FIELD

The present disclosure relates to Fe—Mo—Ni—Cr—P—C—B alloys capable of forming bulk metallic glass rods with diameters greater than 10 mm and as large as 13 mm or larger.

BACKGROUND

Bulk-glass forming Fe—Mo—Ni—Cr—P—C—B alloys capable of forming bulk metallic glass rods with diameters as large as 6 mm have been disclosed in U.S. application Ser. No. 12/783,007, entitled "Tough Iron-Based Bulk Metallic Glass Alloys", filed on May 19, 2010, the disclosure of which is incorporated herein by reference in its entirety. In this earlier patent application, Fe—Mo—P—C—B based compositions with a Mo content of between 2 and 8 atomic percent, P content of between 5 and 17.5 atomic percent, C content of between 3 and 6.5 atomic percent, B content of between 1 and 3.5 atomic percent, and wherein the balance is Fe, were capable of forming bulk metallic glass rods with diameters of at least 2 mm. The earlier patent application also disclosed that when Ni and Cr partially substitute Fe, the glass-forming ability could be further improved. Specifically, alloy composition $Fe_{68}Mo_5Ni_5Cr_2P_{12.5}C_5B_{2.5}$ was disclosed as being capable of forming metallic glass rods of up to 6 mm in diameter.

BRIEF SUMMARY

In the present disclosure, various Fe—Mo—Ni—Cr—P—C—B alloys are disclosed capable of forming metallic glass rods with larger diameters than previously disclosed. In various embodiments, the alloys are capable of forming metallic glass rods with diameters greater than 10 mm and as large as 13 mm or larger. The present disclosure is also directed to metallic glasses formed of the alloys.

The disclosure is directed to an alloy represented by the following formula (subscripts denote atomic percent):

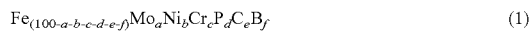

$$Fe_{(100-a-b-c-d-e-f)}Mo_aNi_bCr_cP_dC_eB_f \quad (1)$$

In one embodiment of the alloy, a is between 4.5 and 6.75, b is between 3 and 5.5, c is between 3.25 and 3.75, d is between 11.25 and 12.5, e is between 4.75 and 6.25, f is between 2.25 and 2.75. In some embodiments, the critical rod diameter of the alloy is at least 10 mm.

In another embodiment of the alloy, a is between 5.75 and 6.25, b is between 2.5 and 6.25, c is between 3.25 and 3.75, d is between 11.25 and 12.5, e is between 4.75 and 6.25, f is between 2.25 and 2.75. In some embodiments, the critical rod diameter of the alloy is at least 10 mm.

In another embodiment of the alloy, a is between 5.75 and 6.25, b is between 3 and 5.5, c is between 2.5 and 4, d is between 11.25 and 12.5, e is between 4.75 and 6.25, f is between 2.25 and 2.75. In some embodiments, the critical rod diameter of the alloy is 10 mm.

In another embodiment of the alloy, a is between 5.75 and 6.25, b is between 3 and 5.5, c is between 3.25 and 3.75, d is between 10.75 and 13.25, e is between 4.75 and 6.25, f is between 2.25 and 2.75. In some embodiments, the critical rod diameter of the alloy is at least 10 mm.

In another embodiment of the alloy, a is between 5.75 and 6.25, b is between 3 and 5.5, c is between 3.25 and 3.75, d is between 11.25 and 12.5, e is between 4 and 6.75, f is between 2.25 and 2.75. In some embodiments, the critical rod diameter of the alloy is at least 10 mm.

In another embodiment of the alloy, a is between 5.75 and 6.25, b is between 3 and 5.5, c is between 3.25 and 3.75, d is between 11.25 and 12.5, e is between 4.75 and 6.25, f is between 1.75 and 3.25. In some embodiments, the critical rod diameter of the alloy is at least 10 mm.

In another embodiment of the alloy, a is between 5.75 and 6.25, b is between 3 and 5.5, c is between 3.25 and 3.75, d is between 11.25 and 12.5, e is between 4.75 and 6.25, f is between 2.25 and 2.75. In some embodiments, the critical rod diameter of the alloy is at least 12 mm.

In another embodiment of the alloy, the sum of d, e, and f is between 19.25 and 20.75. In some embodiments, the critical rod diameter of the alloy is at least 11 mm.

In another embodiment of the alloy, the sum of d, e, and f is between 19.5 and 20.5. In some embodiments, the critical rod diameter of the alloy is at least 12 mm.

In yet another embodiment, up to 1 atomic percent of P is substituted by Si.

In yet another embodiment, up to 2 atomic percent of Fe is substituted by Co, Ru, or combinations thereof.

In yet another embodiment, the melt is fluxed with a reducing agent prior to rapid quenching.

In yet another embodiment, the melt is fluxed with boron oxide prior to rapid quenching.

In yet another embodiment, the melt temperature prior to quenching is at least 1300° C.

In yet another embodiment, the melt temperature prior to quenching is at least 1400° C.

In yet another embodiment, quenching the molten alloy comprises injecting or pouring the molten alloy into a metal mold.

In yet another embodiment, the notch toughness, defined as the stress intensity at crack initiation measured on a 3 mm diameter rod containing a notch with length between 1 and 2 mm and root radius between 0.1 and 0.15 mm is at least 40 MPa m$^{1/2}$.

In yet another embodiment, the compressive yield strength is at least 3000 MPa.

In yet another embodiment, the shear modulus is 60 GPa or less.

In yet another embodiment, a wire made of such glass having a diameter of 0.25 mm can undergo macroscopic plastic deformation under bending load without fracturing catastrophically.

The disclosure is also directed to alloy compositions $Fe_{67}Mo_5Ni_5Cr_3P_{12.5}C_5B_{2.5}$, $Fe_{66.5}Mo_5Ni_5Cr_{3.5}P_{12.5}C_5B_{2.5}$, $Fe_{66}Mo_5Ni_5Cr_4P_{12.5}C_5B_{2.5}$, $Fe_{67}Mo_{4.5}Ni_5Cr_{3.5}P_{12.5}C_5B_{2.5}$, $Fe_{66}Mo_{5.5}Ni_5Cr_{3.5}P_{12.5}C_5B_{2.5}$,
$Fe_{65.5}Mo_6Ni_5Cr_{3.5}P_{12.5}C_5B_{2.5}$,
$Fe_{65}Mo_{6.5}Ni_5Cr_{3.5}P_{12.5}C_5B_{2.5}$,
$Fe_{64.5}Mo_7Ni_5Cr_{3.5}P_{12.5}C_5B_{2.5}$,
$Fe_{68}Mo_6Ni_{2.5}Cr_{3.5}P_{12.5}C_5B_{2.5}$,
$Fe_{67.5}Mo_6Ni_3Cr_{3.5}P_{12.5}C_5B_{2.5}$,
$Fe_{67}Mo_6Ni_{3.5}Cr_{3.5}P_{12.5}C_5B_{2.5}$,
$Fe_{66.5}Mo_6Ni_4Cr_{3.5}P_{12.5}C_5B_{2.5}$, $Fe_{66}Mo_6Ni_{4.5}Cr_{3.5}P_{12.5}C_5B_{2.5}$,
$Fe_{65}Mo_6Ni_{5.5}Cr_{3.5}P_{12.5}C_5B_{2.5}$,
$Fe_{64.5}Mo_6Ni_6Cr_{3.5}P_{12.5}C_5B_{2.5}$,
$Fe_{67}Mo_6Ni_{3.5}Cr_{3.5}P_{12.5}C_5B_2$, $Fe_{67}Mo_6Ni_{3.5}Cr_{3.5}P_{12}C_5B_3$,
$Fe_{67}Mo_6Ni_{3.5}Cr_{3.5}P_{13}C_{4.5}B_{2.5}$,
$Fe_{67}Mo_6Ni_{3.5}Cr_{3.5}P_{12}C_{5.5}B_{2.5}$,
$Fe_{67}Mo_6Ni_{3.5}Cr_{3.5}P_{11.5}C_6B_{2.5}$,
$Fe_{67}Mo_6Ni_{3.5}Cr_{3.5}P_{11}C_{6.5}B_{2.5}$, $Fe_{67}Mo_6Ni_{3.5}Cr_{3.5}P_{12}C_6B_2$,
$Fe_{67}Mo_6Ni_{3.5}Cr_{3.5}P_{12}C_5B_3$,
$Fe_{67.5}Mo_6Ni_{3.5}Cr_{3.5}P_{11.5}C_{5.5}B_{2.5}$,
$Fe_{66.5}Mo_6Ni_{3.5}Cr_{3.5}P_{12.5}C_{5.5}B_{2.5}$,
$Fe_{67.42}Mo_{6.04}Ni_{3.52}Cr_{3.52}P_{11.7}C_{5.36}B_{2.44}$, and
$Fe_{66.58}Mo_{5.96}Ni_{3.48}Cr_{3.48}P_{12.3}C_{5.64}B_{2.56}$.

The disclosure is further directed to a metallic glass having composition according to any of the above formulas and/or formed of any of the foregoing alloys.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure.

DETAILED DESCRIPTION

The present disclosure is directed to alloys, metallic glasses, and methods of making and using the same. In some aspects, the alloys are described as capable of forming metallic glasses having certain characteristics. It is intended, and will be understood by those skilled in the art, that the disclosure is also directed to metallic glasses formed of the disclosed alloys described herein.

Description of Alloy Compositions

The disclosure is directed to Fe—Mo—Ni—Cr—P—C—B alloys and metallic glasses. In the present disclosure it was surprisingly discovered that within specified ranges, Fe—Mo—Ni—Cr—P—C—B alloys demonstrate unexpectedly high glass-forming ability. In some embodiments, Fe—Mo—Ni—Cr—P—C—B alloy compositions with a Cr content of between 3 and 4 atomic percent, Ni content of between 3 and 5 atomic percent, Mo content of about 6 atomic percent, P content of between 11.5 and 12.5 atomic percent, B content of about 2.5 atomic percent, C content of between 5 and 6 atomic percent, and wherein the balance is Fe, demonstrate unexpectedly high glass forming ability (GFA). In various embodiments, the critical rod diameter of the alloy is at least 13 mm or larger. Although the glass forming ability is significantly higher, toughness remains essentially unchanged from the alloys disclosure in U.S. patent application Ser. No. 12/783,007.

In the present disclosure, the glass-forming ability of an alloy is quantified by the "critical rod diameter", defined as largest rod diameter in which the amorphous phase can be formed when processed by the method of water quenching a quartz tube with 0.5 mm thick wall containing the molten alloy.

Figure 1:
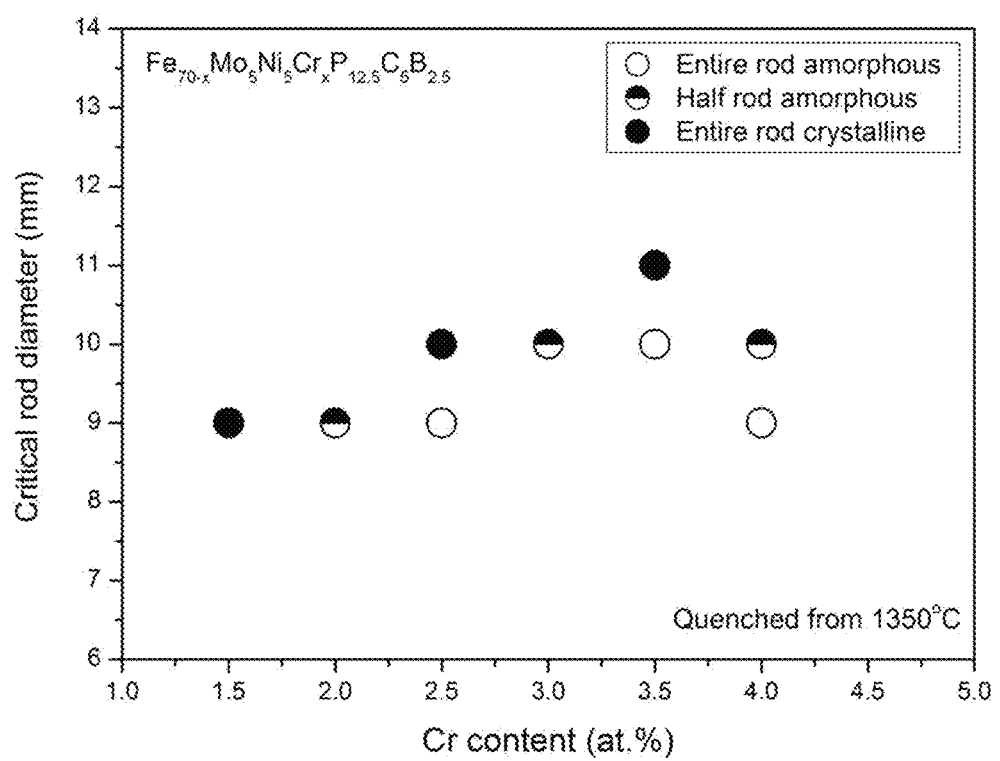
FIG. 1 provides a plot showing the effect of substituting Fe by Cr on the glass forming ability of $Fe_{70-x}Mo_5Ni_5Cr_xP_{12.5}C_5B_{2.5}$, in accordance with embodiments of the present disclosure.
Figure 2:
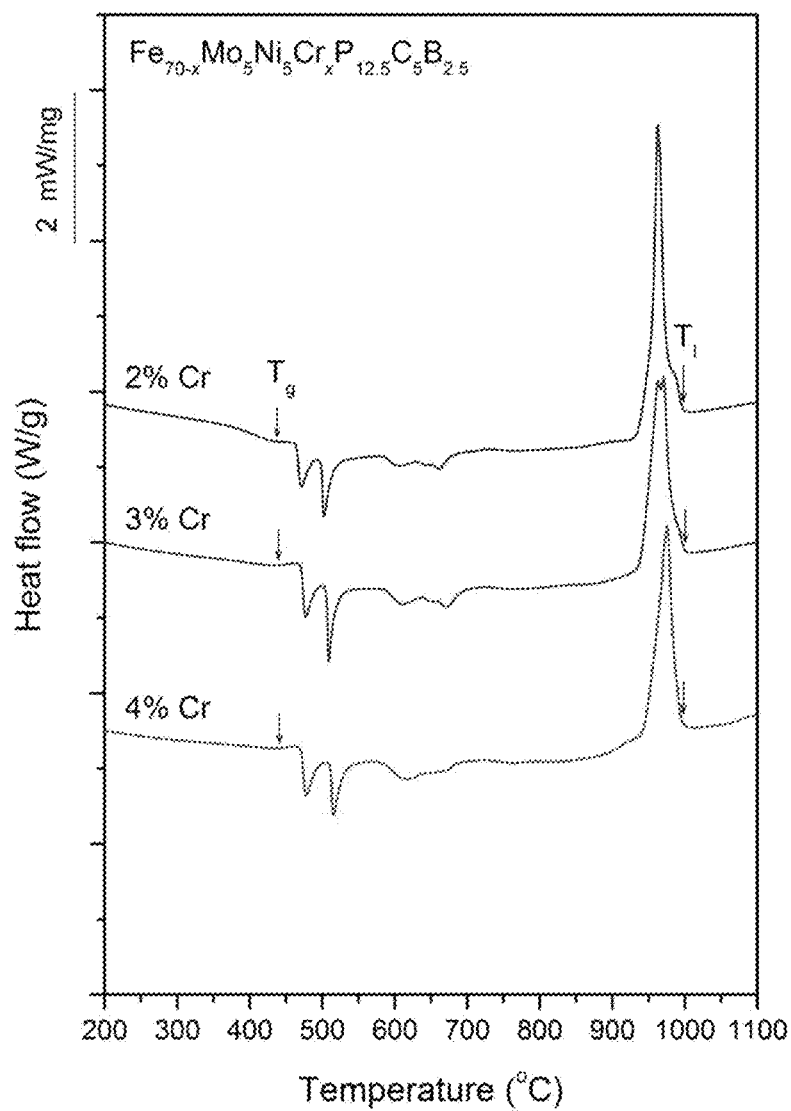
FIG. 2 provides a plot showing calorimetry scans at a scan rate of 20° C./min for sample metallic glasses $Fe_{70-x}Mo_5Ni_5Cr_xP_{12.5}C_5B_{2.5}$, in accordance with embodiments of the present disclosure. Arrows from left to right designate the glass-transition and liquidus temperatures, respectively.

Sample metallic glasses showing the effect of substituting Fe by Cr, according to the formula $Fe_{70-x}Mo_5Ni_5Cr_xP_{12.5}C_5B_{2.5}$, are presented in Table 1 and FIG. 1. As shown, when the Cr atomic percent is between 2 and 4, the critical rod diameter of the alloy is at least 9 mm, while when the Cr atomic percent is between 3 and 3.5, the critical rod diameter is at least 10-mm. Differential calorimetry scans for example metallic glass in which Fe is substituted by Cr are presented in FIG. 2.

TABLE 1

Sample metallic glasses demonstrating the effect of increasing the Cr atomic concentration at the expense of Fe on the glass forming ability of the Fe—Mo—Ni—Cr—P—C—B alloy

| Example | Composition | Critical Rod Diameter [mm] |
| --- | --- | --- |
| 1 | $Fe_{68}Mo_5Ni_5Cr_2P_{12.5}C_5B_{2.5}$ | 9 |
| 2 | $Fe_{67.5}Mo_5Ni_5Cr_{2.5}P_{12.5}C_5B_{2.5}$ | 9 |
| 3 | $Fe_{67}Mo_5Ni_5Cr_3P_{12.5}C_5B_{2.5}$ | 10 |
| 4 | $Fe_{66.5}Mo_5Ni_5Cr_{3.5}P_{12.5}C_5B_{2.5}$ | 10 |
| 5 | $Fe_{66}Mo_5Ni_5Cr_4P_{12.5}C_5B_{2.5}$ | 10 |

Figure 3:
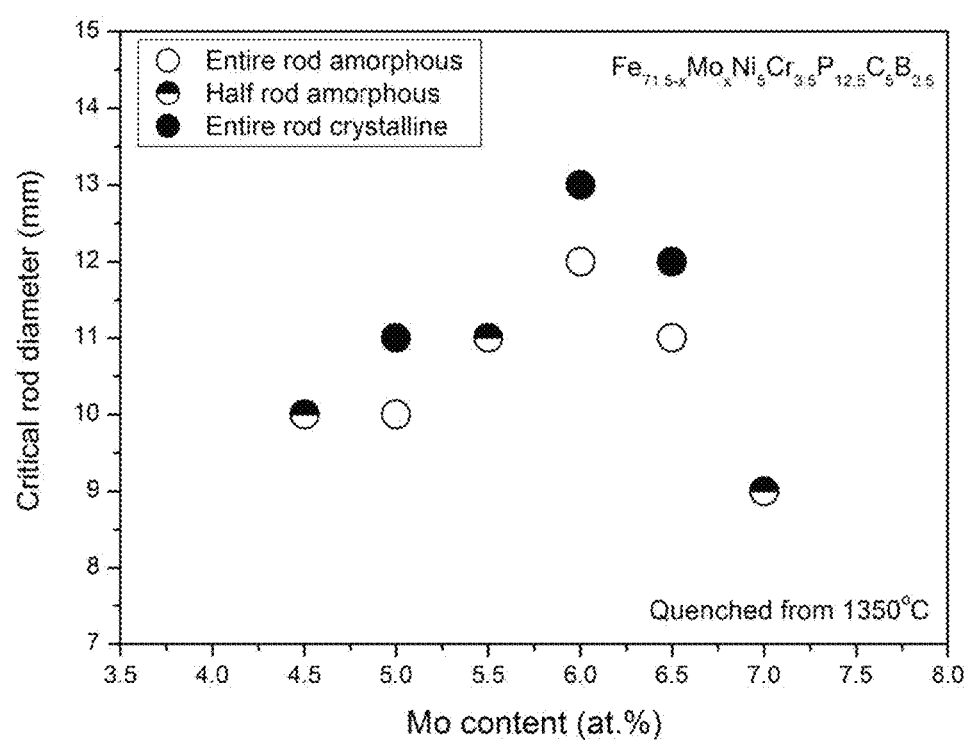
FIG. 3 provides a plot showing the effect of substituting Fe by Mo on the glass forming ability of $Fe_{71.5-x}Mo_xNi_5Cr_{3.5}P_{12.5}C_5B_{2.5}$, in accordance with embodiments of the present disclosure.
Figure 4:
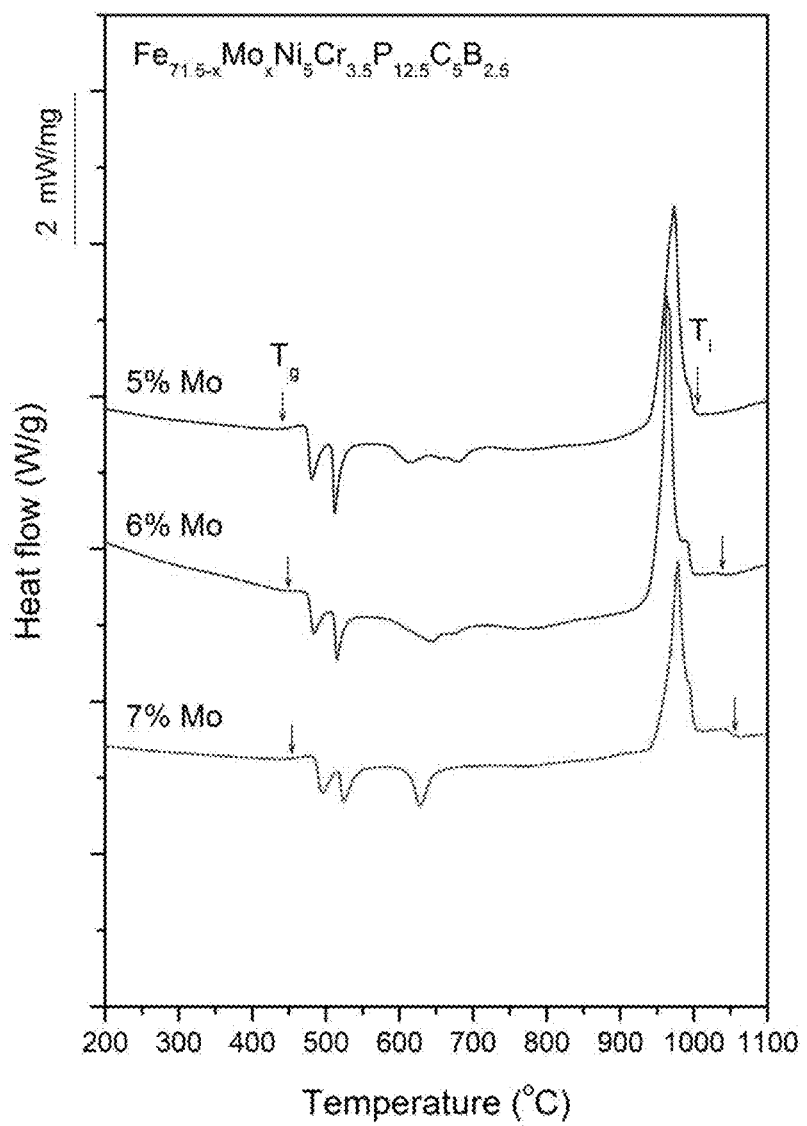
FIG. 4 provides a plot showing calorimetry scans at a scan rate of 20° C./min for sample metallic glasses $Fe_{715-x}Mo_xNi_5Cr_{3.5}P_{12.5}C_5B_{2.5}$, in accordance with embodiments of the present disclosure. Arrows from left to right designate the glass-transition and liquidus temperatures, respectively.

Sample metallic glasses showing the effect of substituting Fe by Mo, according to the formula $Fe_{71.5-x}Mo_xNi_5Cr_{3.5}P_{12.5}C_5B_{2.5}$, are presented in Table 2 and FIG. 3. As shown, when the Mo atomic percent is between 4.5 and 6.75, the critical rod diameter is at least 10 mm, while when the Mo atomic percent is between 5.5 and 6.5, the critical rod diameter is at least 11 mm. Differential calorimetry scans for sample metallic glasses in which Fe is substituted by Mo are presented in FIG. 4.

TABLE 2

Sample metallic glasses demonstrating the effect of increasing the Mo atomic concentration at the expense of Fe on the glass forming ability of the Fe—Mo—Ni—Cr—P—C—B alloy

| Example | Composition | Critical Rod Diameter [mm] |
| --- | --- | --- |
| 6 | $Fe_{67}Mo_{4.5}Ni_5Cr_{3.5}P_{12.5}C_5B_{2.5}$ | 10 |
| 4 | $Fe_{66.5}Mo_5Ni_5Cr_{3.5}P_{12.5}C_5B_{2.5}$ | 10 |

TABLE 2-continued

Sample metallic glasses demonstrating the effect of increasing the Mo atomic concentration at the expense of Fe on the glass forming ability of the Fe—Mo—Ni—Cr—P—C—B alloy

| Example | Composition | Critical Rod Diameter [mm] |
| --- | --- | --- |
| 7 | $Fe_{66}Mo_{5.5}Ni_5Cr_{3.5}P_{12.5}C_5B_{2.5}$ | 11 |
| 8 | $Fe_{65.5}Mo_6Ni_5Cr_{3.5}P_{12.5}C_5B_{2.5}$ | 12 |
| 9 | $Fe_{65}Mo_{6.5}Ni_5Cr_{3.5}P_{12.5}C_5B_{2.5}$ | 11 |
| 10 | $Fe_{64.5}Mo_7Ni_5Cr_{3.5}P_{12.5}C_5B_{2.5}$ | 9 |

Figure 5:
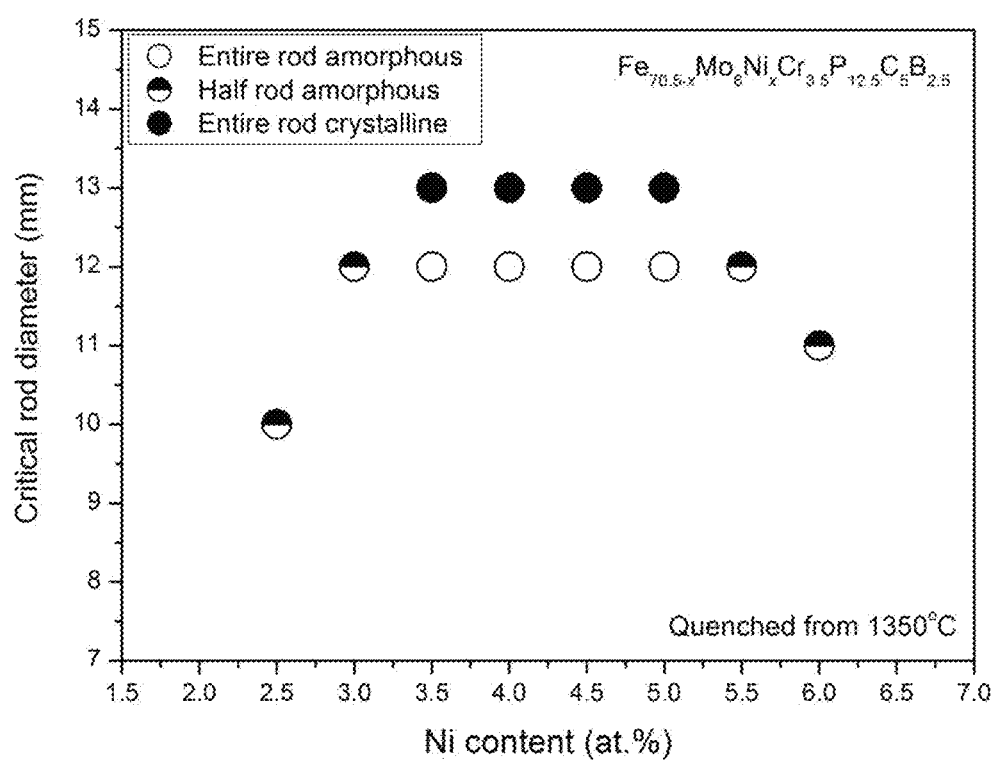
FIG. 5 provides a plot showing the effect of substituting Fe by Ni on the glass forming ability of $Fe_{70.5-x}Mo_6Ni_xCr_{3.5}P_{12.5}C_5B_{2.5}$, in accordance with embodiments of the present disclosure.
Figure 6:
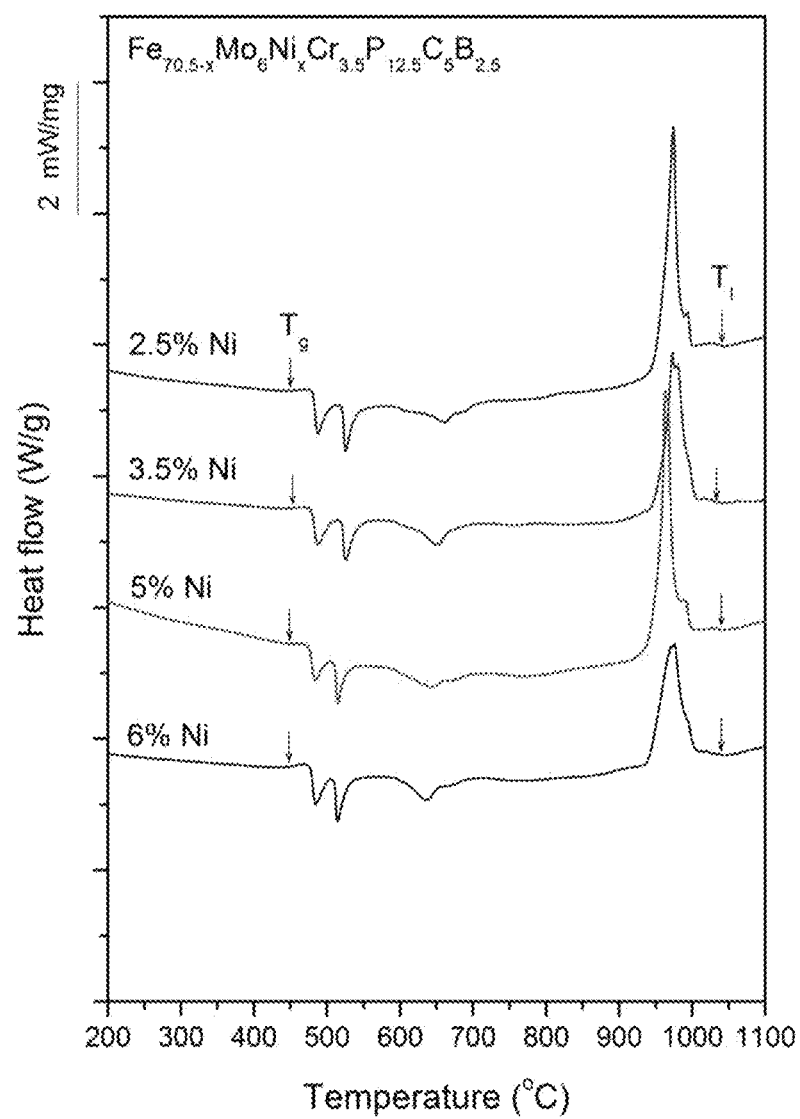
FIG. 6 provides a plot showing calorimetry scans at a scan rate of 20° C./min for sample metallic glasses $Fe_{70.5-x}Mo_6Ni_xCr_{3.5}P_{12.5}C_5B_{2.5}$, in accordance with embodiments of the present disclosure. Arrows from left to right designate the glass-transition and liquidus temperatures, respectively.

Sample metallic glasses showing the effect of substituting Fe by Ni, according to the formula $Fe_{70.5-x}Mo_6Ni_xCr_{3.5}P_{12.5}C_5B_{2.5}$, are presented in Table 3 and FIG. 5. As shown, when the Ni atomic percent is between 3 and 5.5, the critical rod diameter of the alloy is at least 12 mm. Differential calorimetry scans for sample metallic glasses in which Fe is substituted by Ni are presented in FIG. 6.

TABLE 3

Sample metallic glasses demonstrating the effect of increasing the Ni atomic concentration at the expense of Fe on the glass forming ability of the Fe—Mo—Ni—Cr—P—C—B alloy

| Example | Composition | Critical Rod Diameter [mm] |
| --- | --- | --- |
| 11 | $Fe_{68}Mo_6Ni_{2.5}Cr_{3.5}P_{12.5}C_5B_{2.5}$ | 10 |
| 12 | $Fe_{67.5}Mo_6Ni_3Cr_{3.5}P_{12.5}C_5B_{2.5}$ | 12 |
| 13 | $Fe_{67}Mo_6Ni_{3.5}Cr_{3.5}P_{12.5}C_5B_{2.5}$ | 12 |
| 14 | $Fe_{66.5}Mo_6Ni_4Cr_{3.5}P_{12.5}C_5B_{2.5}$ | 12 |
| 15 | $Fe_{66}Mo_6Ni_{4.5}Cr_{3.5}P_{12.5}C_5B_{2.5}$ | 12 |
| 8 | $Fe_{65.5}Mo_6Ni_5Cr_{3.5}P_{12.5}C_5B_{2.5}$ | 12 |
| 16 | $Fe_{65}Mo_6Ni_{5.5}Cr_{3.5}P_{12.5}C_5B_{2.5}$ | 12 |
| 17 | $Fe_{64.5}Mo_6Ni_6Cr_{3.5}P_{12.5}C_5B_{2.5}$ | 11 |

Figure 7:
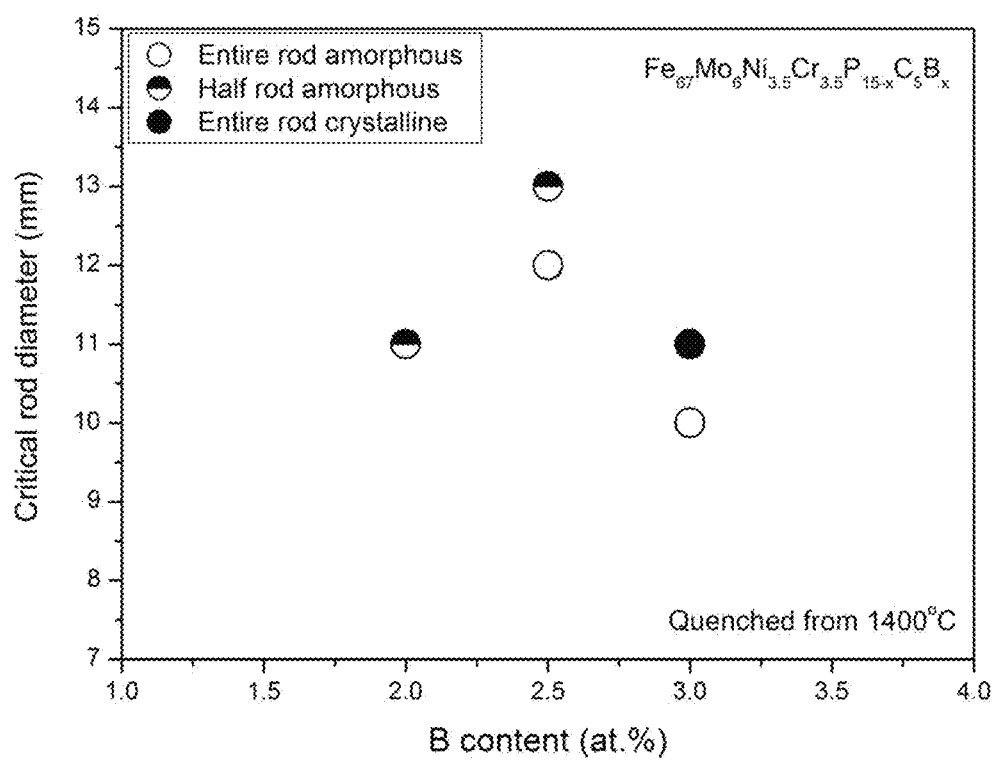
FIG. 7 provides a plot showing the effect of substituting P by B on the glass forming ability of $Fe_{67}Mo_6Ni_{3.5}Cr_{3.5}P_{15-x}C_5B_x$, in accordance with embodiments of the present disclosure.
Figure 8:
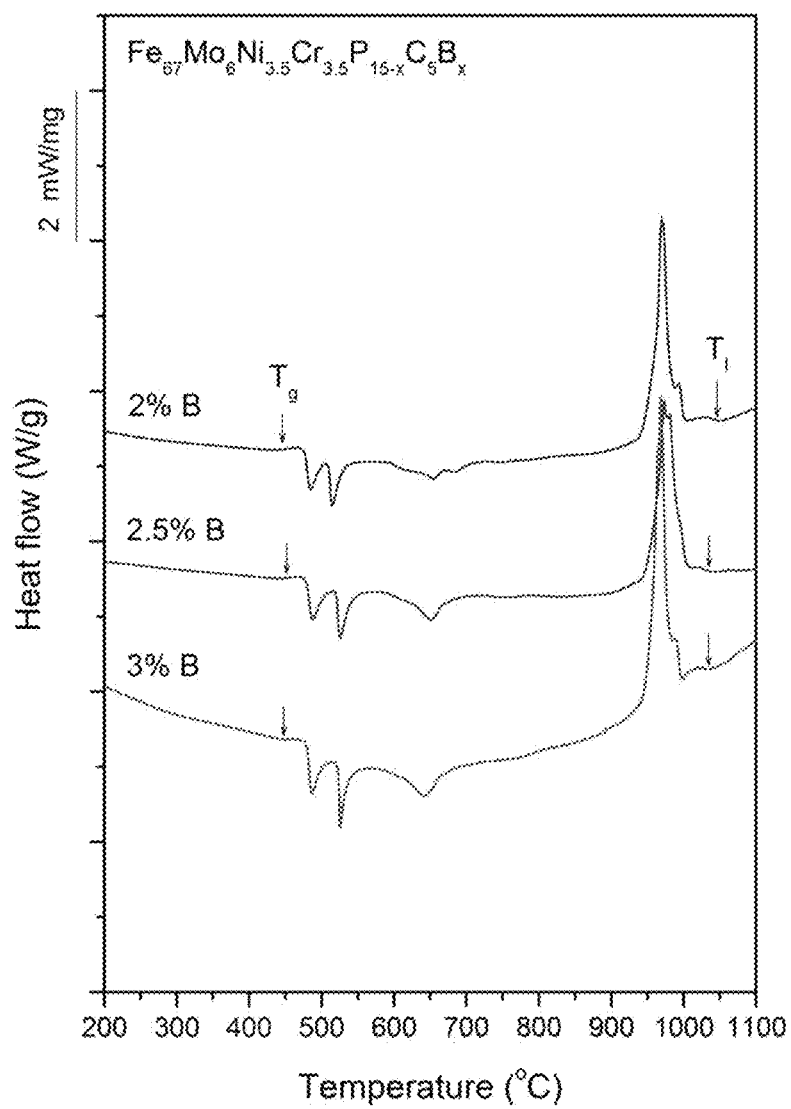
FIG. 8 provides a plot showing calorimetry scans at a scan rate of 20° C./min for sample metallic glasses $Fe_{67}Mo_6Ni_{3.5}Cr_{3.5}P_{15-x}C_5B_x$, in accordance with embodiments of the present disclosure. Arrows from left to right designate the glass-transition and liquidus temperatures, respectively.

Sample metallic glasses showing the effect of substituting P by B, according to the formula $Fe_{67}Mo_6Ni_{3.5}Cr_{3.5}P_{15-x}C_5B_x$, are presented in Table 4 and FIG. 7. As shown, when the B atomic percent is between 1.75 and 3.25, the critical rod diameter of the alloy is at least 10 mm, while when the B atomic percent is between 2 and 2.75, the critical rod diameter is at least 11 mm. Differential calorimetry scans for sample metallic glasses in which P is substituted by B are presented in FIG. 8.

TABLE 4

Sample metallic glasses demonstrating the effect of increasing the B atomic concentration at the expense of P on the glass forming ability of the Fe—Mo—Ni—Cr—P—C—B alloy

| Example | Composition | Critical Rod Diameter [mm] |
| --- | --- | --- |
| 18 | $Fe_{67}Mo_6Ni_{3.5}Cr_{3.5}P_{13}C_5B_2$ | 11 |
| 13 | $Fe_{67}Mo_6Ni_{3.5}Cr_{3.5}P_{12.5}C_5B_{2.5}$ | 13 |
| 19 | $Fe_{67}Mo_6Ni_{3.5}Cr_{3.5}P_{12}C_5B_3$ | 10 |

Figure 9:
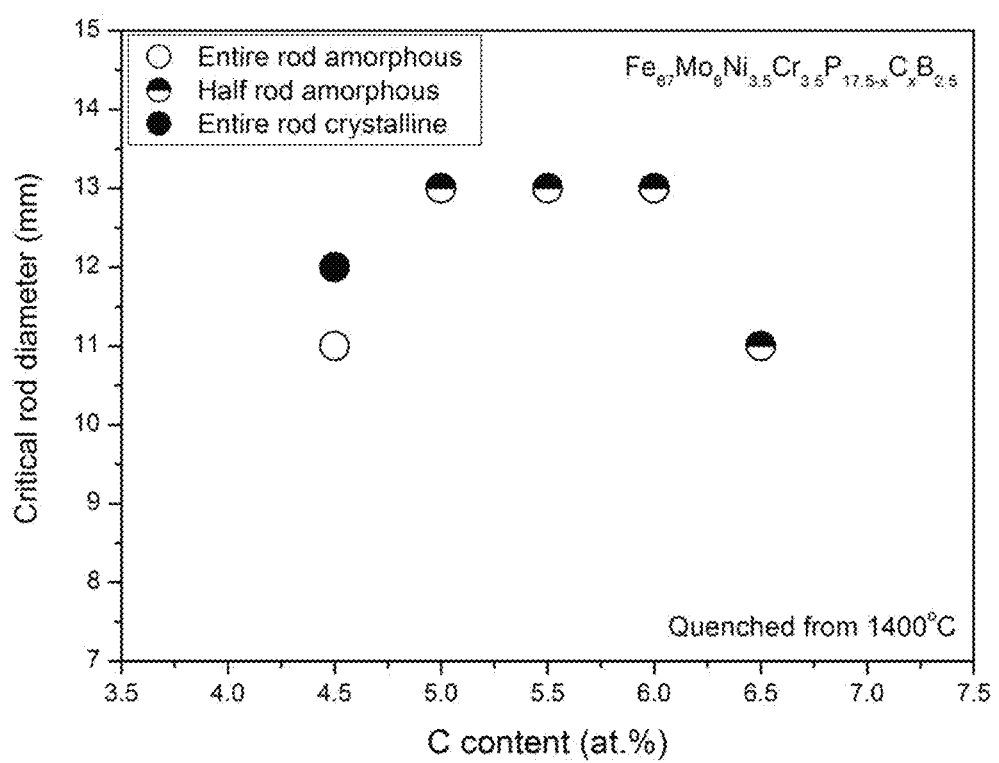
FIG. 9 provides a plot showing the effect of substituting P by C on the glass forming ability of $Fe_{67}Mo_6Ni_{3.5}Cr_{3.5}P_{17.5-x}C_xB_{2.5}$, in accordance with embodiments of the present disclosure.
Figure 10:
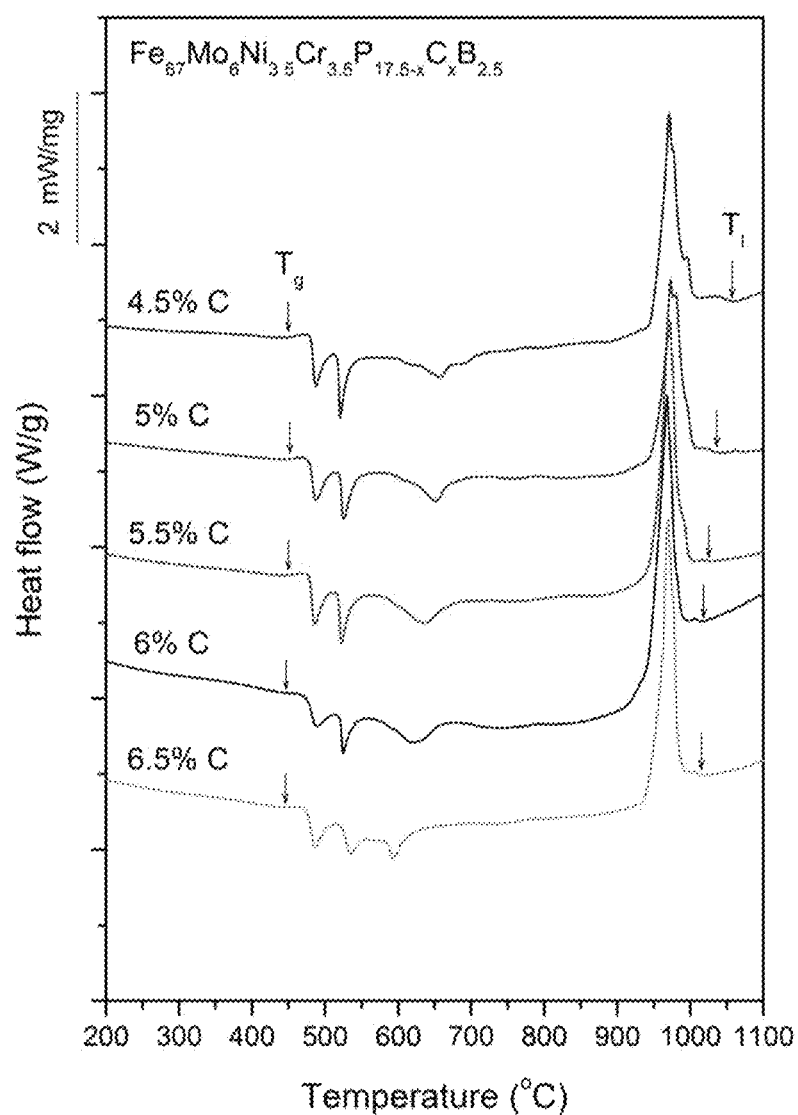
FIG. 10 provides a plot showing calorimetry scans at a scan rate of 20° C./min for sample metallic glasses $Fe_{67}Mo_6Ni_{3.5}Cr_{3.5}P_{17.5-x}C_xB_{2.5}$, in accordance with embodiments of the present disclosure. Arrows from left to right designate the glass-transition and liquidus temperatures, respectively.

Sample metallic glasses showing the effect of substituting P by C, according to the formula $Fe_{67}Mo_6Ni_{3.5}Cr_{3.5}P_{17.5-x}C_xB_{2.5}$, are presented in Table 5 and FIG. 9. As shown, when the C atomic percent is between 4.25 and 6.5, the critical rod diameter is at least 11 mm, while when the C atomic percent is between 5 and 6, the critical rod diameter is at least 13 mm. Differential calorimetry scans for sample metallic glasses in which P is substituted by C are presented in FIG. 10.

TABLE 5

Sample metallic glasses demonstrating the effect of increasing the C atomic concentration at the expense of P on the glass forming ability of the Fe—Mo—Ni—Cr—P—C—B alloy

| Example | Composition | Critical Rod Diameter [mm] |
|---|---|---|
| 20 | $Fe_{67}Mo_6Ni_{3.5}Cr_{3.5}P_{13}C_{4.5}B_{2.5}$ | 11 |
| 13 | $Fe_{67}Mo_6Ni_{3.5}Cr_{3.5}P_{12.5}C_5B_{2.5}$ | 13 |
| 21 | $Fe_{67}Mo_6Ni_{3.5}Cr_{3.5}P_{12}C_{5.5}B_{2.5}$ | 13 |
| 22 | $Fe_{67}Mo_6Ni_{3.5}Cr_{3.5}P_{11.5}C_6B_{2.5}$ | 13 |
| 23 | $Fe_{67}Mo_6Ni_{3.5}Cr_{3.5}P_{11}C_{6.5}B_{2.5}$ | 11 |

Figure 11:
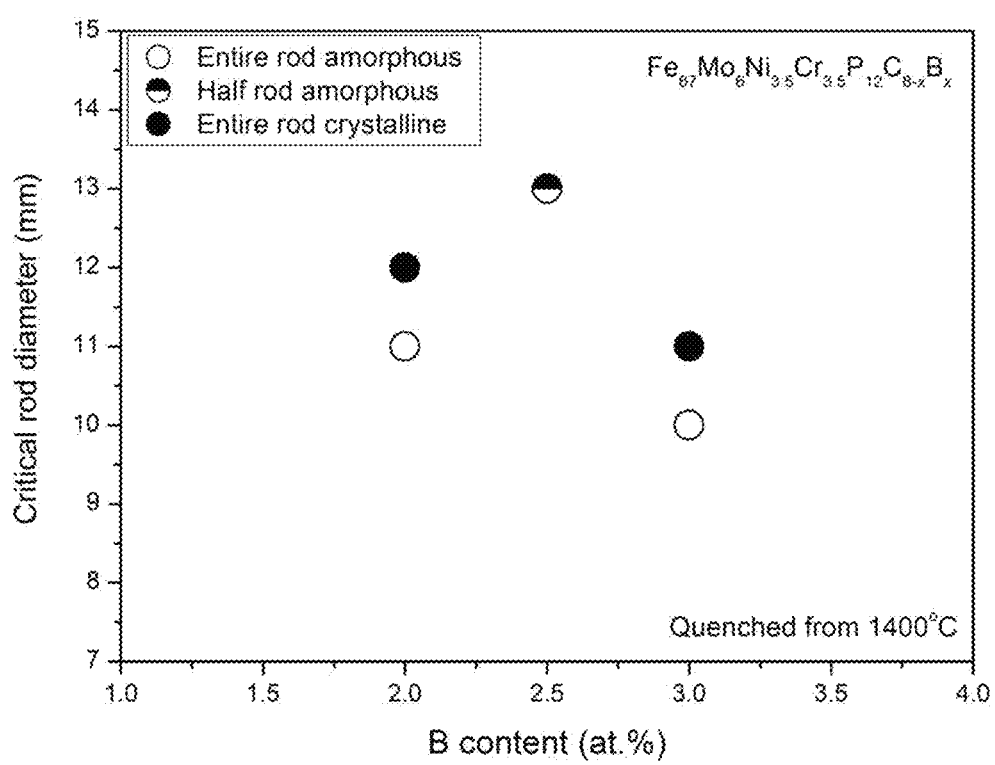
FIG. 11 provides a plot showing the effect of substituting C by B on the glass forming ability of $Fe_{67}Mo_6Ni_{3.5}Cr_{3.5}P_{12}C_{8-x}B_x$, in accordance with embodiments of the present disclosure.
Figure 12:
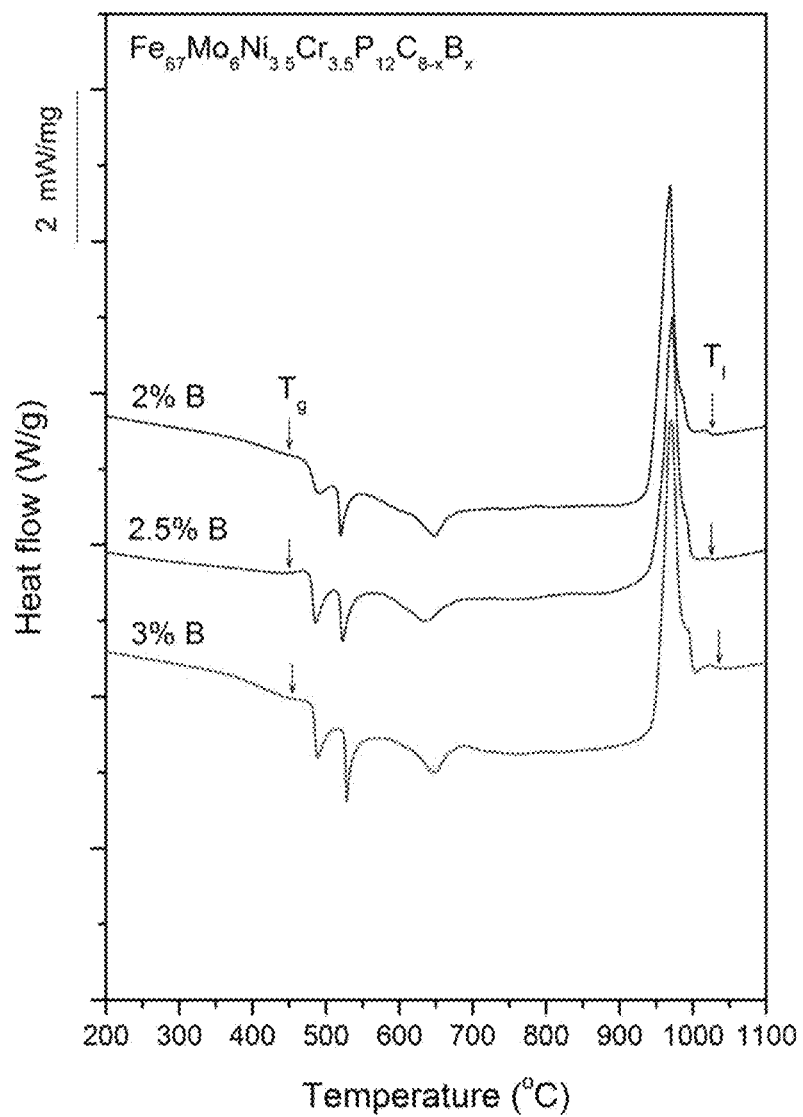
FIG. 12 provides a plot showing calorimetry scans at a scan rate of 20° C./min for sample metallic glasses $Fe_{67}Mo_6Ni_{3.5}Cr_{3.5}P_{12}C_{8-x}B_x$, in accordance with embodiments of the present disclosure. Arrows from left to right designate the glass-transition and liquidus temperatures, respectively.

Sample metallic glasses showing the effect of substituting C by B, according to the formula $Fe_{67}Mo_6Ni_{3.5}Cr_{3.5}P_{12}C_{8-x}B_x$, are presented in Table 6 and FIG. 11. As shown, when the B atomic percent is between 1.75 and 3.25, the critical rod diameter is at least 10 mm, while when the B atomic percent is between 2 and 2.75, the critical rod diameter is at least 11 mm. Differential calorimetry scans for sample metallic glasses in which C is substituted by B are presented in FIG. 12.

TABLE 6

Sample metallic glasses demonstrating the effect of increasing the B atomic concentration at the expense of C on the glass forming ability of the Fe—Mo—Ni—Cr—P—C—B alloy

| Example | Composition | Critical Rod Diameter [mm] |
|---|---|---|
| 24 | $Fe_{67}Mo_6Ni_{3.5}Cr_{3.5}P_{12}C_6B_2$ | 11 |
| 21 | $Fe_{67}Mo_6Ni_{3.5}Cr_{3.5}P_{12}C_{5.5}B_{2.5}$ | 13 |
| 25 | $Fe_{67}Mo_6Ni_{3.5}Cr_{3.5}P_{12}C_5B_3$ | 10 |

Figure 13:
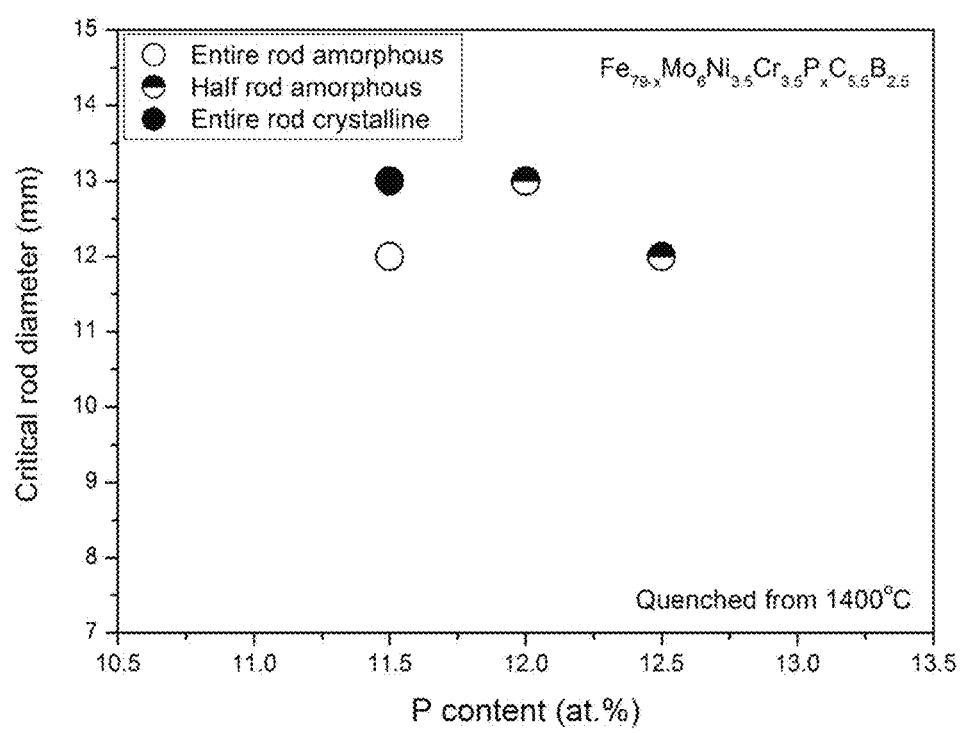
FIG. 13 provides a plot showing the effect of substituting Fe by P on the glass forming ability of $Fe_{79-x}Mo_6Ni_{3.5}Cr_{3.5}P_xC_{5.5}B_{2.5}$, in accordance with embodiments of the present disclosure.
Figure 14:
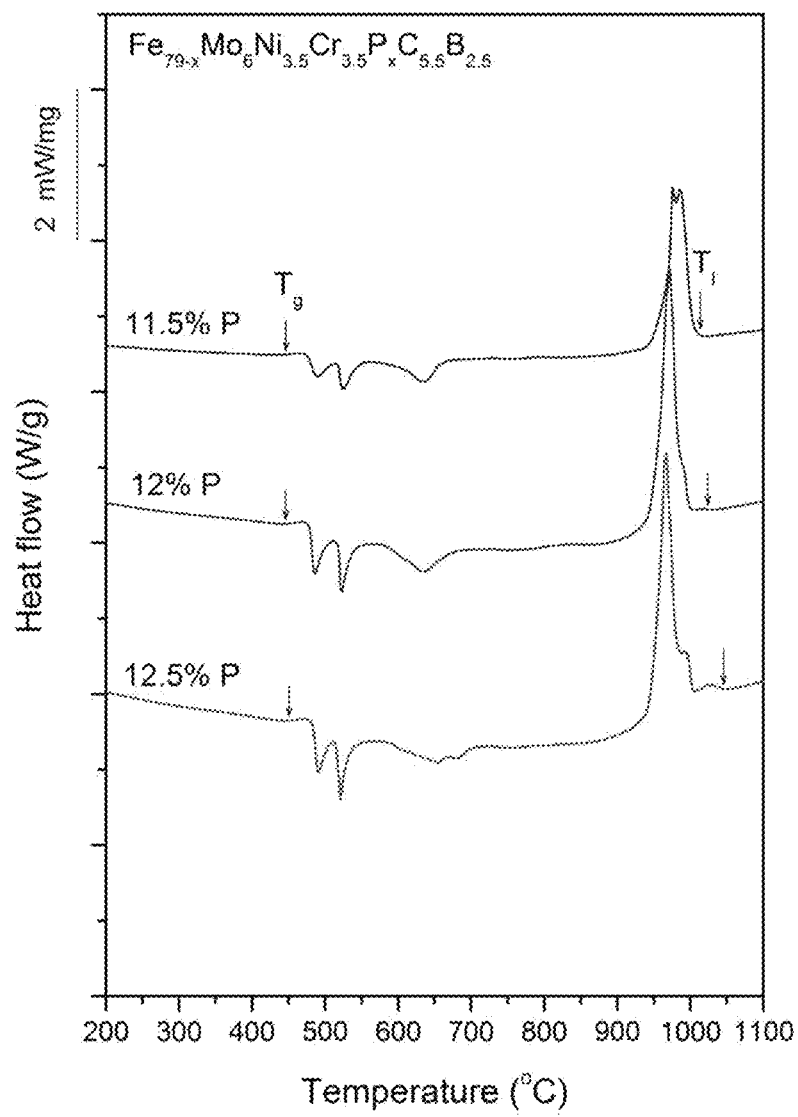
FIG. 14 provides a plot showing calorimetry scans at a scan rate of 20° C./min for sample metallic glasses $Fe_{79-x}Mo_6Ni_{3.5}Cr_{3.5}P_xC_{5.5}B_{2.5}$, in accordance with embodiments of the present disclosure. Arrows from left to right designate the glass-transition and liquidus temperatures, respectively.

Sample metallic glasses showing the effect of substituting Fe by P, according to the formula $Fe_{79-x}Mo_6Ni_{3.5}Cr_{3.5}P_xC_{5.5}B_{2.5}$, are presented in Table 7 and FIG. 13. As shown, when the P atomic percent is between 11 and 13, the critical rod diameter is at least than 11 mm, while when the P atomic percent is between 11.5 and 12.5, the critical rod diameter is at least than 12 mm. Differential calorimetry scans for sample metallic glasses in which Fe is substituted by P are presented in FIG. 14.

TABLE 7

Sample metallic glasses demonstrating the effect of increasing the P atomic concentration at the expense of Fe on the glass forming ability of the Fe—Mo—Ni—Cr—P—C—B alloy

| Example | Composition | Critical Rod Diameter [mm] |
|---|---|---|
| 26 | $Fe_{67.5}Mo_6Ni_{3.5}Cr_{3.5}P_{11.5}C_{5.5}B_{2.5}$ | 12 |
| 21 | $Fe_{67}Mo_6Ni_{3.5}Cr_{3.5}P_{12}C_{5.5}B_{2.5}$ | 13 |
| 27 | $Fe_{66.5}Mo_6Ni_{3.5}Cr_{3.5}P_{12.5}C_{5.5}B_{2.5}$ | 12 |

Figure 15:
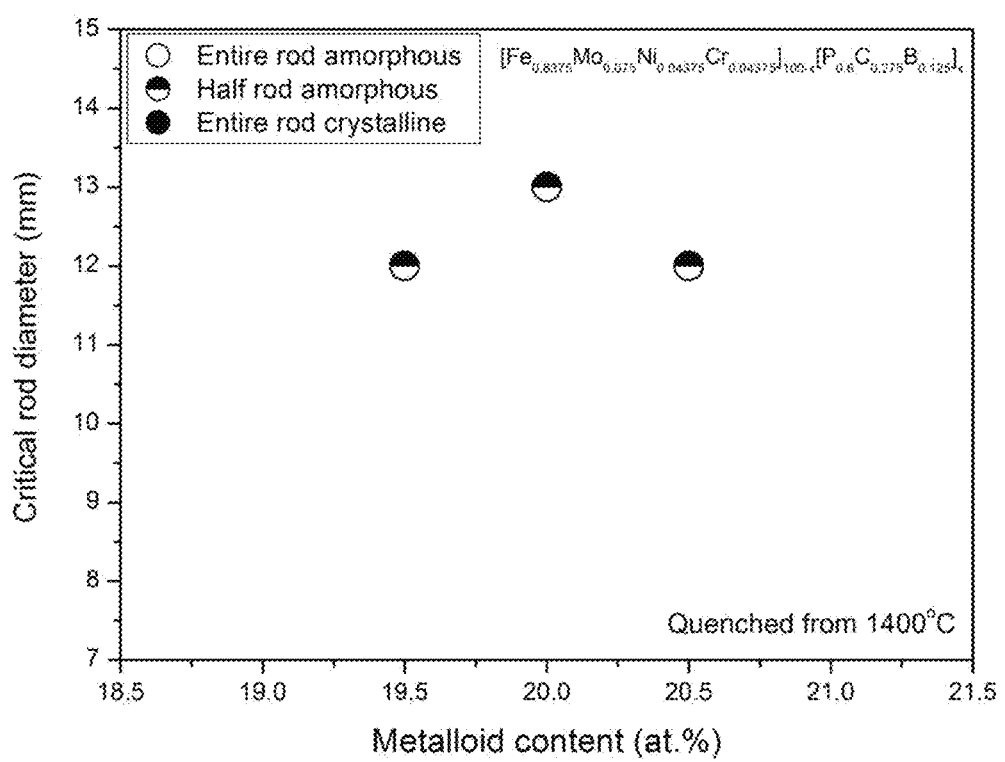
FIG. 15 provides a plot showing the effect of varying the metal to metalloid ratio on the glass forming ability of $(Fe_{0.8375}Mo_{0.075}Ni_{0.04375}Cr_{0.04375})_{100-x}(P_{0.6}C_{0.275}B_{0.125})_x$, in accordance with embodiments of the present disclosure.
Figure 16:
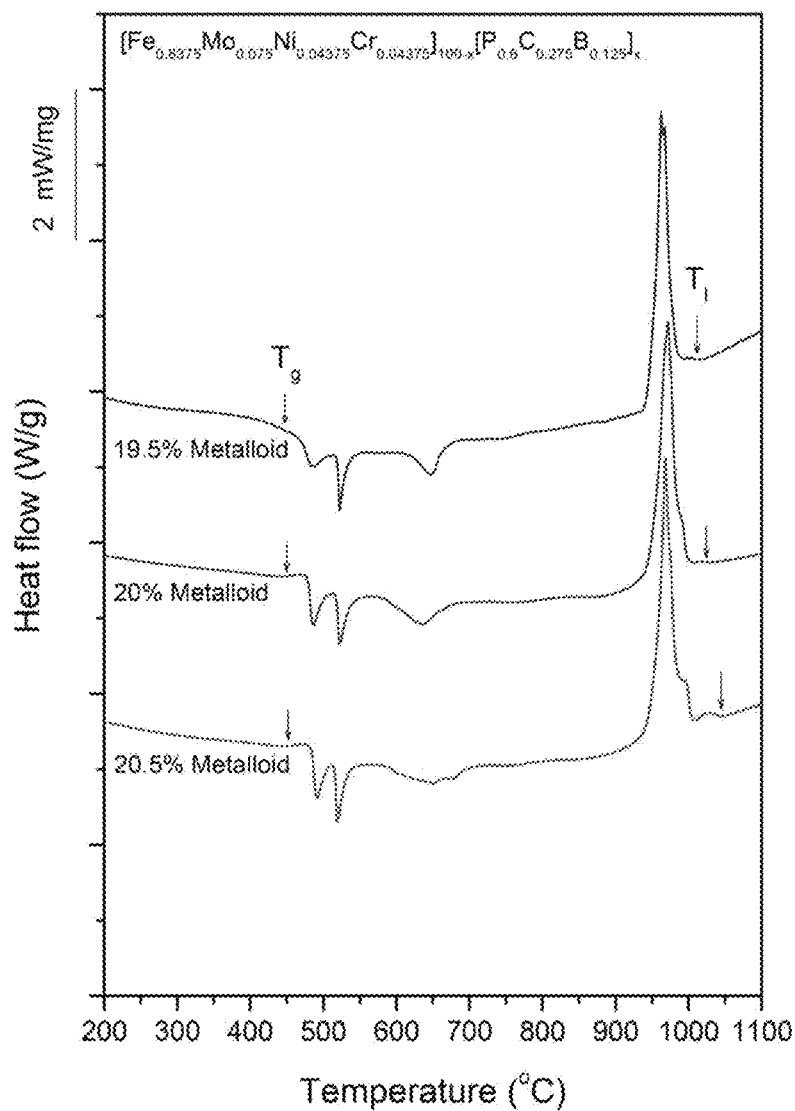
FIG. 16 provides a plot showing calorimetry scans at a scan rate of 20° C./min for sample metallic glasses $(Fe_{0.8375}Mo_{0.075}Ni_{0.04375}Cr_{0.04375})_{100-x}(P_{0.6}C_{0.275}B_{0.125})_x$, in accordance with embodiments of the present disclosure. Arrows from left to right designate the glass-transition and liquidus temperatures, respectively.

Sample metallic glasses showing the effect of varying the metal to metalloid ratio, according to the formula $(Fe_{0.8375}Mo_{0.075}Ni_{0.04375}Cr_{0.04375})_{100-x}(P_{0.6}C_{0.275}B_{0.125})_x$, are presented in Table 8 and FIG. 15. As shown, when the metalloid atomic percent x is between 19 and 21, the critical rod diameter is at least 11 mm, while when the metalloid atomic percent is between 19.5 and 20.5, the critical rod diameter is at least 12 mm. Differential calorimetry scans for sample metallic glasses in which the metal to metalloid ratio is varied are presented in FIG. 16.

TABLE 8

Sample metallic glasses demonstrating the effect of increasing the total metalloid concentration at the expense of metals on the glass forming ability of the Fe—Mo—Ni—Cr—P—C—B alloy

| Example | Composition | Critical Rod Diameter[mm] |
|---|---|---|
| 28 | $Fe_{67.42}Mo_{6.04}Ni_{3.52}Cr_{3.52}P_{11.7}C_{5.36}B_{2.44}$ | 12 |
| 21 | $Fe_{67}Mo_6Ni_{3.5}Cr_{3.5}P_{12}C_{5.5}B_{2.5}$ | 13 |
| 29 | $Fe_{66.58}Mo_{5.96}Ni_{3.48}Cr_{3.48}P_{12.3}C_{5.64}B_{2.56}$ | 12 |

Figure 17:
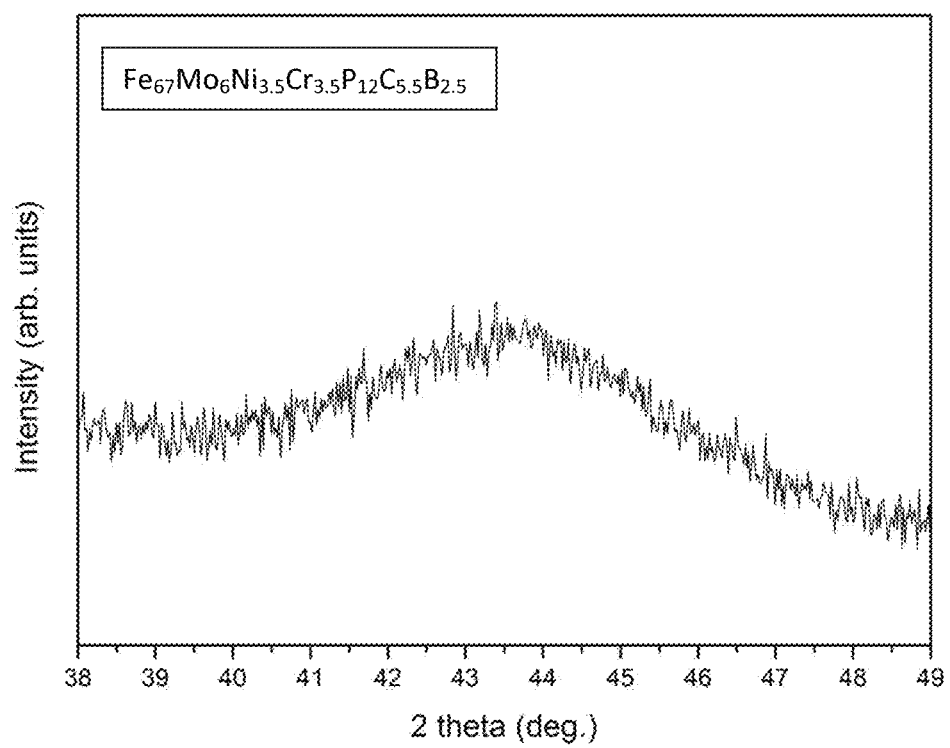
FIG. 17 provides an X-ray diffractogram verifying the amorphous structure of a 13 mm metallic glass rod of $Fe_{67}Mo_6Ni_{3.5}Cr_{3.5}P_{12}C_{5.5}B_{2.5}$, in accordance with embodiments of the present disclosure.
Figure 18:
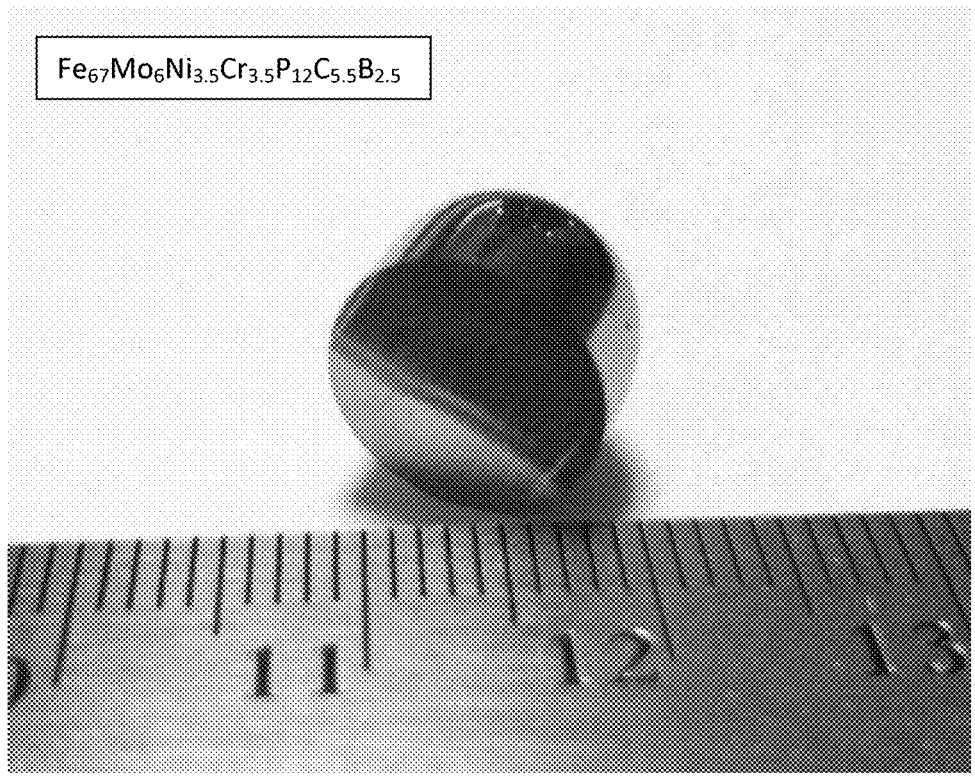
FIG. 18 provides an image of an amorphous 11 mm rod of example metallic glass $Fe_{67}Mo_6Ni_{3.5}Cr_{3.5}P_{12}C_{5.5}B_{2.5}$.

Among the compositions investigated in this disclosure, the alloy exhibiting the highest glass-forming ability is Example 21, having composition $Fe_{67}Mo_6Ni_{3.5}Cr_{3.5}P_{12}C_{5.5}B_{2.5}$, which has a critical rod diameter of 13 mm. An x-ray diffractogram taken on the cross section of a 13 mm diameter $Fe_{67}Mo_6Ni_{3.5}Cr_{3.5}P_{12}C_{5.5}B_{2.5}$ rod verifying its amorphous structure is shown in FIG. 17. An image of an 11 mm diameter $Fe_{67}Mo_6Ni_{3.5}Cr_{3.5}P_{12}C_{5.5}B_{2.5}$ metallic glass rod is shown in FIG. 18.

Figure 19:
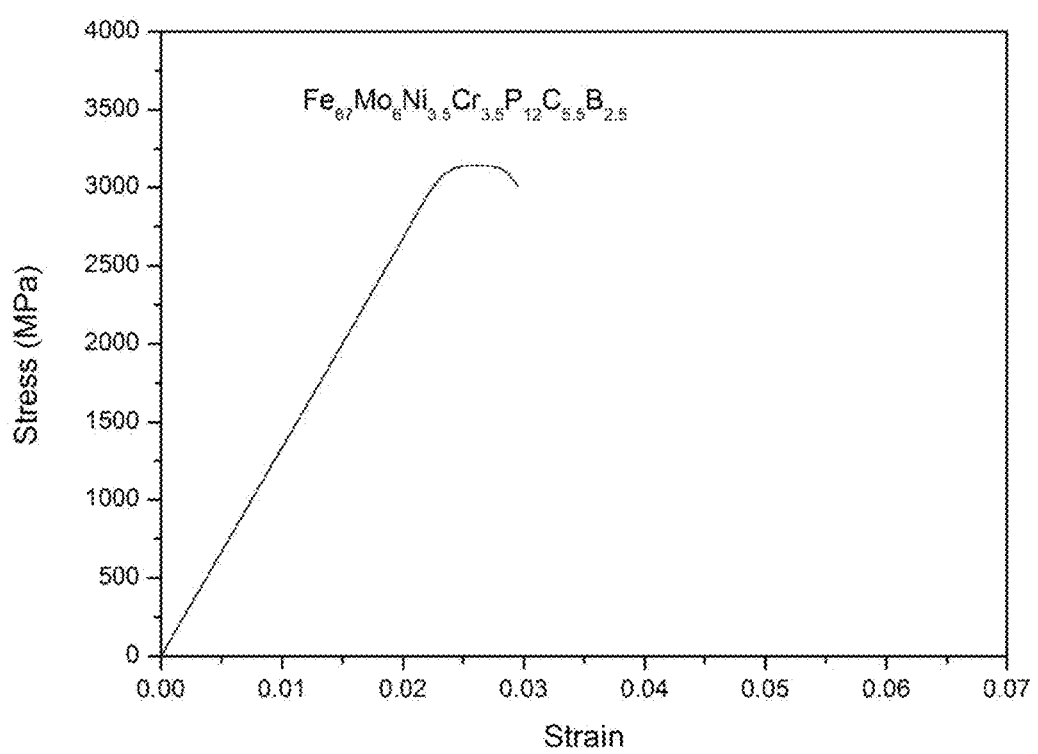
FIG. 19 provides a compressive stress-strain diagram for example metallic glass $Fe_{67}Mo_6Ni_{3.5}Cr_{3.5}P_{12}C_{5.5}B_{2.5}$, in accordance with embodiments of the present disclosure.

The measured shear, bulk, and Young's moduli, Poisson's ratio, density, notch toughness, and yield strength of sample metallic glass $Fe_{67}Mo_6Ni_{3.5}Cr_{3.5}P_{12}C_{5.5}B_{2.5}$ (Example 21) are listed along with the critical rod diameter in Table 9. The notch toughness of all metallic glass compositions according to the current disclosure is expected to be at least 40 MPa m$^{1/2}$, and the yield strength at least 3000 MPa. The stress-strain diagram for sample metallic glass $Fe_{67}Mo_6Ni_{3.5}Cr_{3.5}P_{12}C_{5.5}B_{2.5}$ is presented in FIG. 19. Lastly, below a certain thickness, the sample metallic glasses exhibit bending ductility. Specifically, under an applied bending load, the sample metallic glasses are capable of undergoing plastic bending in the absence of fracture for diameters up to at least 0.25 mm.

TABLE 9

Engineering properties for sample metallic glass $Fe_{67}Mo_6Ni_{3.5}Cr_{3.5}P_{12}C_{5.5}B_{2.5}$

| | |
|---|---|
| Critical rod diameter | 13 mm |
| Density | 7.52 g/cc |
| Yield strength | 3145 MPa |
| Notch toughness | 48 ± 1.7 MPa m$^{1/2}$ |
| Shear modulus | 59.4 GPa |
| Bulk modulus | 151.7 GPa |
| Young's modulus | 157.6 GPa |
| Poisson's ratio | 0.327 |

Figure 20:
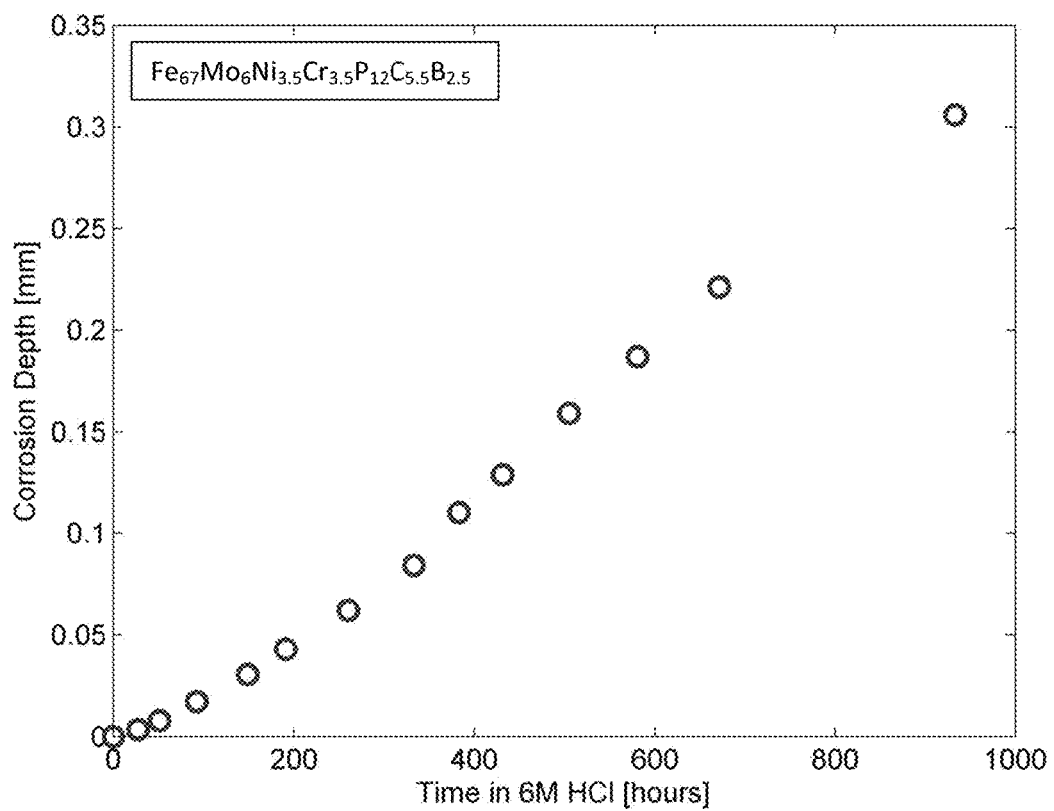
FIG. 20 provides a plot of the corrosion depth versus time in a 6M HCl solution for a 3 mm metallic glass rod having composition $Fe_{67}Mo_6Ni_{3.5}Cr_{3.5}P_{12}C_{5.5}B_{2.5}$, in accordance with embodiments of the present disclosure.

Lastly, the Fe—Mo—Ni—Cr—P—C—B metallic glasses also exhibit good resistance to corrosion. The corrosion resistance of example metallic glass $Fe_{67}Mo_6Ni_{3.5}Cr_{3.5}P_{12}C_{5.5}B_{2.5}$ (Example 21) is evaluated by immersion test in 6M HCl. A plot of the corrosion depth versus time is presented in FIG. 20. The corrosion depth at approximately 933 hours is measured to be about 306 micrometers. The corrosion rate is estimated to be 2.87 mm/year. The corrosion rate of all metallic glass compositions according to the current disclosure is expected to be under 10 mm/year.

Description of Methods of Processing the Alloys

A method for producing the sample alloys involves inductive melting of the appropriate amounts of elemental constituents in a quartz tube under inert atmosphere. The purity levels of the constituent elements were as follows: Fe 99.95%, Mo 99.95%, Ni 99.995%, Cr 99.996% (crystalline), P 99.9999%, C 99.9995%, and B 99.5%. A method for producing metallic glass rods from the alloy ingots involves re-melting the ingots in quartz tubes of 0.5-mm thick walls in a furnace at 1300° C. or higher, and preferably at 1400° C. or higher, under high purity argon and rapidly quenching in a room-temperature water bath. In general, amorphous articles from the alloy of the present disclosure can be produced by (1) re-melting the alloy ingots in quartz tubes of 0.5-mm thick walls, holding the melt at a temperature of about 1300° C. or higher, and preferably at 1400° C. or higher, under inert atmosphere, and rapidly quenching in a liquid bath; or (2) re-melting the alloy ingots, holding the melt at a temperature of about 1300° C. or higher, and preferably at 1400° C. or higher, under inert atmosphere, and injecting or pouring the molten alloy into a metal mold, preferably made of copper, brass, or steel. Optionally, prior to producing an amorphous article, the alloyed ingots can be fluxed with a reducing agent by re-melting the ingots in a quartz tube under inert atmosphere, bringing the alloy melt in contact with the molten reducing agent and allowing the two melts to interact for about 1000 s or longer at a temperature of about 1300° C. or higher, and preferably at 1400° C. or higher, and subsequently water quenching.

Test Methodology for Measuring Notch Toughness

The notch toughness of sample metallic glasses was performed on 3-mm diameter rods. The rods were notched using a wire saw with a root radius of between 0.10 and 0.13 μm to a depth of approximately half the rod diameter. The notched specimens were placed on a 3-point bending fixture with span distance of 12.7 mm and carefully aligned with the notched side facing downward. The critical fracture load was measured by applying a monotonically increasing load at constant cross-head speed of 0.001 mm/s using a screw-driven testing frame. At least three tests were performed, and the variance between tests is included in the notch toughness plots. The stress intensity factor for the geometrical configuration employed here was evaluated using the analysis by Murakimi (Y. Murakami, Stress Intensity Factors Handbook, Vol. 2, Oxford: Pergamon Press, p. 666 (1987), the disclosure of which is incorporated herein by reference).

Test Methodology for Measuring Yield Strength

Compression testing of sample metallic glasses was performed on cylindrical specimens 3 mm in diameter and 6 mm in length by applying a monotonically increasing load at constant cross-head speed of 0.001 mm/s using a screw-driven testing frame. The strain was measured using a linear variable differential transformer. The compressive yield strength was estimated using the 0.2% proof stress criterion.

Test Methodology for Measuring Density and Elastic Constants

The shear and longitudinal wave speeds of sample metallic glasses were measured ultrasonically on a cylindrical specimen 3 mm in diameter and about 3 mm in length using a pulse-echo overlap set-up with 25 MHz piezoelectric transducers. Densities were measured by the Archimedes method, as given in the American Society for Testing and Materials standard C693-93.

Test Methodology for Measuring Corrosion Resistance

The corrosion resistance of sample metallic glasses was evaluated by immersion tests in hydrochloric acid (HCl). A rod of metallic glass sample with initial diameter of 2.97 mm, and a length of 18.86 mm was immersed in a bath of 6M HCl at room temperature. The density of the metallic glass rod was measured using the Archimedes method to be 7.52 g/cc. The corrosion depth at various stages during the immersion was estimated by measuring the mass change with an accuracy of ±0.01 mg. The corrosion rate was estimated assuming linear kinetics.

The metallic glasses described herein can be valuable in the fabrication of electronic devices. An electronic device herein can refer to any electronic device known in the art. For example, it can be a telephone, such as a mobile phone, and a land-line phone, or any communication device, such as a smart phone, including, for example an iPhone®, and an electronic email sending/receiving device. It can be a part of a display, such as a digital display, a TV monitor, an electronic-book reader, a portable web-browser (e.g., iPad®), and a computer monitor. It can also be an entertainment device, including a portable DVD player, conventional DVD player, Blue-Ray disk player, video game console, music player, such as a portable music player (e.g., iPod®), etc. It can also be a part of a device that provides control, such as controlling the streaming of images, videos, sounds (e.g., Apple TV®), or it can be a remote control for an electronic device. It can be a part of a computer or its accessories, such as the hard drive tower housing or casing, laptop housing, laptop keyboard, laptop track pad, desktop keyboard, mouse, and speaker. The article can also be applied to a device such as a watch or a clock. Since the Fe—Mo—Ni—Cr—P—C—B metallic glasses are soft magnets, they may be used, for example, as EMI shielding materials in electronic components or devices.

Having described several embodiments, it will be recognized by those skilled in the art that various modifications, alternative constructions, and equivalents may be used without departing from the spirit of the disclosure. Those skilled in the art will appreciate that the presently disclosed embodiments teach by way of example and not by limitation. Therefore, the matter contained in the above description or shown in the accompanying drawings should be interpreted as illustrative and not in a limiting sense. Additionally, a number of well-known processes and elements have not been described in order to avoid unnecessarily obscuring the disclosure. The following claims are intended to cover all generic and specific features described herein, as well as all statements of the scope of the present method and system, which, as a matter of language, might be said to fall therebetween.

What is claimed:

1. An amorphous alloy represented by the following formula: $Fe_{(100-a-b-c-d-e-f)}Mo_aNi_bCr_cP_dC_eB_f$, wherein each of subscripts a, b, c, d, e, and f is in atomic percent, wherein values of a, b, c, d, e, and f are selected from the group consisting of
  i) a is between 4.5 and 6.75, b is between 3 and 5.5, c is between 3.25 and 3.75, d is between 11.25 and 12.5, e is between 4.75 and 6.25, f is between 2.25 and 2.75;
  ii) a is between 5.75 and 6.25, b is between 2.5 and 6.25, c is between 3.25 and 3.75, d is between 11.25 and 12.5, e is between 4.75 and 6.25, f is between 2.25 and 2.75;
  iii) a is between 5.75 and 6.25, b is between 3 and 5.5, c is between 2.5 and 4, d is between 11.25 and 12.5, e is between 4.75 and 6.25, f is between 2.25 and 2.75;
  iv) a is between 5.75 and 6.25, b is between 3 and 5.5, c is between 3.25 and 3.75, d is between 10.75 and 13.25, e is between 4.75 and 6.25, f is between 2.25 and 2.75;
  v) a is between 5.75 and 6.25, b is between 3 and 5.5, c is between 3.25 and 3.75, d is between 11.25 and 12.5, e is between 4 and 6.75, f is between 2.25 and 2.75; and
  vi) a is between 5.75 and 6.25, b is between 3 and 5.5, c is between 3.25 and 3.75, d is between 11.25 and 12.5, e is between 4.75 and 6.25, f is between 1.75 and 3.25;
  and wherein the alloy has a critical rod diameter of at least 10 mm, wherein the amorphous alloy has a notch toughness, defined as the stress intensity factor at crack initiation when measured on a 3 mm diameter rod containing a notch with length ranging from 1 to 2 mm and root radius ranging from 0.1 to 0.15 mm, of at least 40 MPa m$^{1/2}$.

2. The amorphous alloy of claim 1, wherein a is between 4.5 and 6.75, b is between 3 and 5.5, c is between 3.25 and 3.75, d is between 11.25 and 12.5, e is between 4.75 and 6.25, f is between 2.25 and 2.75.

3. The amorphous alloy of claim 1, wherein a is between 5.75 and 6.25, b is between 2.5 and 6.25, c is between 3.25 and 3.75, d is between 11.25 and 12.5, e is between 4.75 and 6.25, f is between 2.25 and 2.75.

4. The amorphous alloy of claim 1, wherein a is between 5.75 and 6.25, b is between 3 and 5.5, c is between 2.5 and 4, d is between 11.25 and 12.5, e is between 4.75 and 6.25, f is between 2.25 and 2.75.

5. The amorphous alloy of claim 1, wherein a is between 5.75 and 6.25, b is between 3 and 5.5, c is between 3.25 and 3.75, d is between 10.75 and 13.25, e is between 4.75 and 6.25, f is between 2.25 and 2.75.

6. The amorphous alloy of claim 1, wherein a is between 5.75 and 6.25, b is between 3 and 5.5, c is between 3.25 and 3.75, d is between 11.25 and 12.5, e is between 4 and 6.75, f is between 2.25 and 2.75.

7. The amorphous alloy of claim 1, wherein a is between 5.75 and 6.25, b is between 3 and 5.5, c is between 3.25 and 3.75, d is between 11.25 and 12.5, e is between 4.75 and 6.25, f is between 1.75 and 3.25.

8. An amorphous alloy represented by the following formula: Fe$_{(100-a-b-c-d-e-f)}$Mo$_a$Ni$_b$Cr$_c$P$_d$C$_e$B$_f$, wherein each of subscripts a, b, c, d, e, and f is in atomic percent, wherein a is between 5.75 and 6.25, b is between 3 and 5.5, c is between 3.25 and 3.75, d is between 11.25 and 12.5, e is between 4.75 and 6.25, f is between 2.25 and 2.75, and wherein the alloy has a critical rod diameter of at least 12 mm, wherein the amorphous alloy a notch toughness, defined as the stress intensity factor at crack initiation when measured on a 3 mm diameter rod containing a notch with length ranging from 1 to 2 mm and root radius ranging from 0.1 to 0.15 mm, of at least 40 MPa m$^{1/2}$.

9. The amorphous alloy of claim 1, wherein the sum of d, e, and f is between 19.25 and 20.75, and wherein the critical rod diameter of the alloy is at least 11 mm.

10. The amorphous alloy of claim 1, wherein the sum of d, e, and f is between 19.5 and 20.5, and wherein the critical rod diameter of the alloy is at least 12 mm.

11. The amorphous alloy of claim 1, wherein up to 1 atomic percent of P is substituted by Si.

12. The amorphous alloy of claim 1, wherein up to 2 atomic percent of Fe is substituted by Co, Ru, or combinations thereof.

13. The amorphous alloy of claim 1, wherein the amorphous alloy has a yield strength of at least 3000 MPa.

14. A method of producing the amorphous alloy of claim 1 comprising:
melting the alloy into a molten state; and
quenching the melt at a cooling rate sufficiently rapid to prevent crystallization of the alloy.

15. The method of claim 14, further comprising fluxing the melt with a reducing agent prior to quenching.

16. The method of claim 15, wherein the reducing agent is boron oxide.

17. The method of claim 14, wherein the melt temperature prior to quenching is at least 1300° C.

18. The method of claim 14, the step of quenching the molten alloy comprises injecting or pouring the molten alloy into a metal mold.

* * * * *